(12) United States Patent
Wang et al.

(10) Patent No.: US 8,971,238 B2
(45) Date of Patent: Mar. 3, 2015

(54) METHOD FOR CONTROLLING WIRELESS ROUTER AND WIRELESS ROUTER

(75) Inventors: Yonghong Wang, Shanghai (CN); Xiuyi Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 13/487,554

(22) Filed: Jun. 4, 2012

(65) Prior Publication Data

US 2012/0269126 A1    Oct. 25, 2012

Related U.S. Application Data

(63) Continuation of application No. PCT/CN2011/073263, filed on Apr. 25, 2011.

(51) Int. Cl.
| | | |
|---|---|---|
| H04B 7/185 | (2006.01) |
| H04B 7/00 | (2006.01) |
| H04B 1/38 | (2006.01) |
| H04W 52/02 | (2009.01) |

(52) U.S. Cl.
CPC ............ *H04W 52/0251* (2013.01); *Y02B 60/50* (2013.01)
USPC ............................. 370/318; 455/522; 455/574

(58) Field of Classification Search
USPC ......................................................... 370/318
See application file for complete search history.

(56) References Cited

U.S. PATENT DOCUMENTS

| | | | |
|---|---|---|---|
| 2006/0100002 A1 | 5/2006 | Luebke | |
| 2007/0165545 A1 | 7/2007 | Dobrowski | |
| 2008/0214228 A1* | 9/2008 | Bouchard et al. | 455/522 |
| 2009/0191926 A1 | 7/2009 | Doyle | |
| 2010/0331049 A1* | 12/2010 | Diaz Mateos et al. | 455/562.1 |
| 2011/0216683 A1* | 9/2011 | Ju et al. | 370/311 |
| 2012/0214550 A1* | 8/2012 | Galaro et al. | 455/561 |

FOREIGN PATENT DOCUMENTS

| | | |
|---|---|---|
| CN | 101420790 A | 4/2009 |
| CN | 101489294 A | 7/2009 |
| CN | 201323572 Y | 10/2009 |
| CN | 101877611 A | 11/2010 |

OTHER PUBLICATIONS

Partial translation of Office Action dated Apr. 16, 2013 in connection with Chinese Patent Application No. 201180000290.4.
English-language translation of International Search Report from the Chinese Patent Office in International Application No. PCT/CN2011/073263 mailed Feb. 2, 2012.

* cited by examiner

*Primary Examiner* — Shaq Taha

(57) ABSTRACT

A method for controlling a wireless router and a wireless router includes: detecting whether the wireless router has a connection with a terminal; and if the wireless router has no connection with any terminal, turning off the wireless router. By using the method for controlling a wireless router and the wireless router provided in embodiments of the present invention, whether the wireless router has a connection with a terminal may be detected; and the wireless router is turned off when the wireless router has no connection with any terminal. In this way, the wireless router may be automatically turned off in an idle state, which saves energy resources and avoids unnecessary consumption.

5 Claims, 2 Drawing Sheets

METHOD FOR CONTROLLING WIRELESS ROUTER AND WIRELESS ROUTER

CROSS-REFERENCE TO RELATED APPLICATIONS

This application is a continuation of International Application No. PCT/CN2011/073263, filed on Apr. 25, 2011, which is hereby incorporated by reference in its entirety.

FIELD OF THE INVENTION

The present invention relates to the field of communications technologies, and in particular, to a method for controlling a wireless router and a wireless router.

BACKGROUND OF THE INVENTION

An existing wireless router is generally powered by an external power supply. The wireless router does not have a low power consumption design, which results in high power consumption when the wireless router is idle.

For a new wireless router powered by a battery, the battery maybe easily used up due to high power consumption in an idle state. In an existing design, for the wireless router powered by the battery, a user may manually turn off the router when the wireless router is not required in order to reduce power consumption of the battery. However, manually turning off the router causes inconvenience to the user, and the user usually forgets to turn off the wireless router, which also causes high consumption of the wireless router and speeds up the power consumption of the battery.

SUMMARY OF THE INVENTION

Embodiments of the present invention provide a method for controlling a wireless router and a wireless router to reduce power consumption of the wireless router.

An embodiment of the present invention provides a method for controlling a wireless router, including:

detecting whether the wireless router has a connection with a terminal; and if the wireless router has no connection with any terminal, turning off the wireless router.

An embodiment of the present invention provides a wireless router, including:

a detecting module, configured to detect whether the wireless router has a connection with a terminal; and a closing module, configured to turn off the wireless router if the wireless router has no connection with any terminal.

By using the method for controlling a wireless router and the wireless router provided in embodiments of the present invention, whether the wireless router has a connection with a terminal may be detected; and the wireless router is turned off when the wireless router has no connection with any terminal. In this way, the wireless router may be automatically turned off in an idle state, which saves energy resources and avoids unnecessary consumption.

BRIEF DESCRIPTION OF THE DRAWINGS

To make the technical solutions in the embodiments of the present invention clearer, the accompanying drawings for illustrating the embodiments of the present invention are briefly described below. Evidently, the accompanying drawings described below illustrate only some embodiment of the present invention and persons of ordinary skill in the art can derive other drawings from such accompanying drawings without any creative efforts.

DETAILED DESCRIPTION OF THE EMBODIMENTS

To make the objectives, technical solutions, and merits of the present invention clearer, the present invention is described clearly and completely with reference to the accompanying drawings below. Evidently, the embodiments described are only a part of rather than all of the embodiments of the present invention. All other embodiments that persons of ordinary skill in the art obtain based on the embodiments of the present invention without creative efforts also fall within the protection scope of the present invention.

Figure 1:
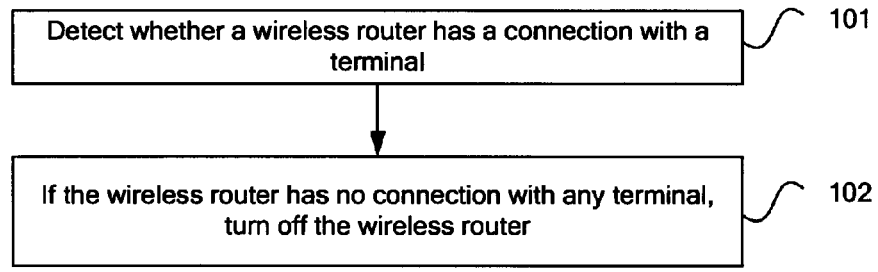
FIG. 1 is a flowchart of a first embodiment of a method for controlling a wireless router according to the present invention.

FIG. 1 is a flowchart of a first embodiment of a method for controlling a wireless router according to the present invention. As shown in FIG. 1, the method includes the following steps:

Step 101: Detect whether the wireless router has a connection with a terminal.

In this embodiment, an executor may be a wireless router. The wireless router may be powered by an external power supply or by a battery. The terminal in this embodiment may be a terminal device that is capable of accessing a network through the wireless router, for example, a computer and a mobile phone. The wireless router is configured to implement data transfer between terminals or between the terminal and the network.

The wireless router detects whether the wireless router has a connection with a terminal. The specific detection method may include, for example: 1. if the wireless router does not transfer data within a period of time, performing connection detection on an IP address of a terminal without a data activity; if no response is received within a period of time, determining that the wireless router has no connection with the terminal; and if a response is received, determining that the wireless router has a connection with the terminal; 2. detecting whether a logical association between the wireless router and a terminal is established on an air interface; if no logical association exists, determining that the wireless router has no connection with the terminal; if a logical association exists, determining that the wireless router currently has a connection with the terminal.

Step 102: If the wireless router has no connection with any terminal, turn off the wireless router.

If the wireless router detects that no connection exists between the wireless router and any terminal, the wireless router is turned off. In this way, the wireless router may be turned off in an idle state, which reduces power consumption, saves energy resources, and avoids unnecessary consumption. In particular, when the wireless router is powered by the battery, the power consumption of the battery may be reduced.

In this embodiment of the present invention, the wireless router may detect whether the wireless router has a connection with a terminal; and the wireless router is turned off when the wireless router has no connection with any terminal. In this way, the wireless router may be automatically turned off in the idle state, which saves energy resources and avoids unnecessary consumption.

Figure 2:
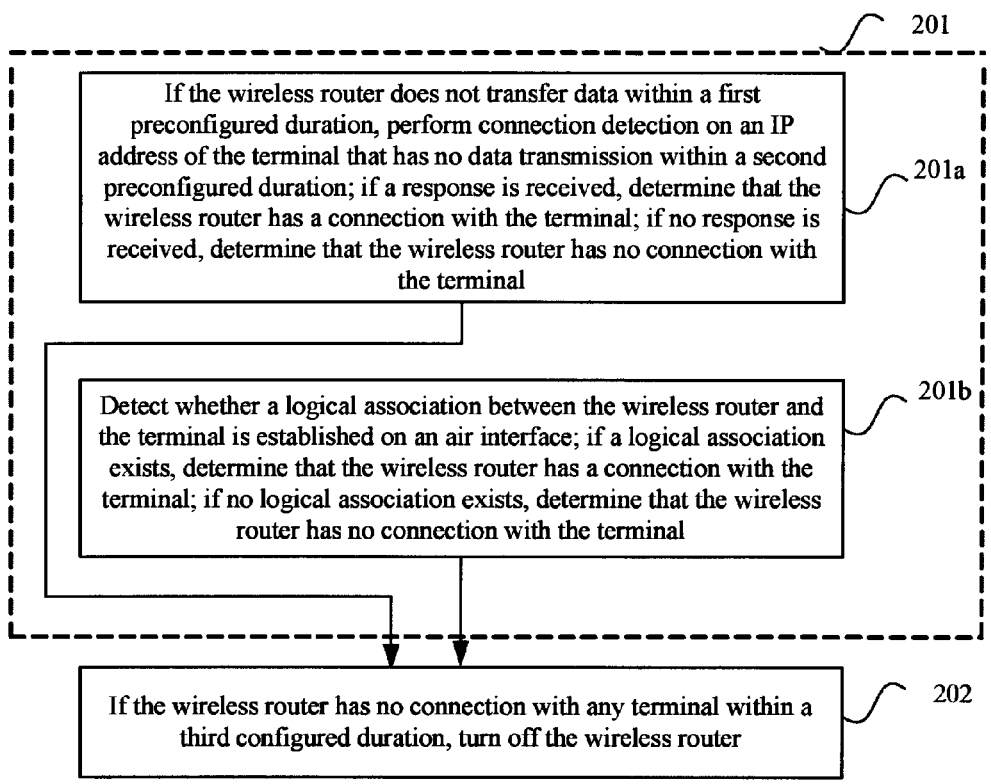
FIG. 2 is a flowchart of a second embodiment of a method for controlling a wireless router according to the present invention.

FIG. 2 is a flowchart of a second embodiment of a method for controlling a wireless router according to the present invention. As shown in FIG. 2, the method includes the following steps:

Step 201: Detect whether a wireless router has a connection with a terminal.

In this embodiment, an executor may be a wireless router. The step of detecting, by the wireless router, whether the wireless router has a connection with a terminal may include step 201*a* or step 201*b*.

Step 201*a*: If the wireless router does not transfer data within a first preconfigured duration, perform connection detection on an IP address of a terminal that has no data transmission within a second preconfigured duration; if a response is received, it is detected that the wireless router has a connection with the terminal; if no response is received, it is detected that the wireless router has no connection with the terminal.

Specifically, if the wireless router does not transfer data within a period of time (the first preconfigured duration), the connection detection is performed on the IP address of the terminal that has no data transmission within the second preconfigured duration; if a response is received from the terminal within a preconfigured duration (for example, t1), it indicates that the wireless router has a connection with the terminal; if no response is received from the terminal within a preconfigured duration (for example, t1), it indicates that the wireless router has no connection with the terminal, where the connection detection performed may be, for example, a Packet Internet Grope (PING, Packet Internet Grope) test or the connection detection may be, for example, as follows: The router sends a data packet used for connection detection to a terminal to be detected, and judges, according to whether a response is received from the terminal, whether the router has a connection with the terminal.

The process of obtaining the IP address of the terminal that has no data transmission within the second preconfigured duration may include the following: The wireless router obtains an IP address corresponding to the terminal from a data packet sent by a network side or the terminal; if no more data packet corresponding to the IP address is received within the second preconfigured duration, the IP address is the IP address of the terminal that has no data transmission within the second preconfigured duration. Specifically, the wireless router receives a data packet sent by the network side or the terminal, obtains the IP address corresponding to the terminal from the data packet, and starts timing; if the wireless router does not receive data sent from the IP address or data sent to the IP address within the second preconfigured duration, it is determined that the IP address is the IP address of the terminal that has no data transmission within the second preconfigured duration. The first preconfigured duration and the second preconfigured duration may be set according to an actual situation.

PING is a DOS (Disk Operating System, disk operating system) command and is generally used to detect whether a network connection is available. Specifically, PING may be an "echo request" message of the (Internet Control Message Protocol) IMCP protocol sent by a local end; if an "echo reply" message is received from a peer end, it proves that the local end and the peer end are connected.

Step 201*b*: Detect whether a logical association between the wireless router and a terminal is established on an air interface; if a logical association exists, it is detected that the wireless router has a connection with the terminal; if no logical association exists, it is detected that the wireless router has no connection with the terminal.

If the terminal has a connection with the wireless router, the terminal may establish a logical association with a wireless local area network (Wireless Local Area Network, WLAN) on the air interface. Therefore, the wireless router may know whether a terminal has a connection with the wireless router at present by detecting whether a logical association is established on the air interface.

Before detecting whether the logical association between the wireless router and the terminal is established on the air interface, whether the wireless router transfers data may be detected first; and if no data is transferred, whether the logical association between the wireless router and the terminal is established on the air interface is detected.

Step 202: If the wireless router has no connection with any terminal within a third preconfigured duration, turn off the wireless router.

If it is detected that the wireless router has no connection with any terminal, it indicates that the current wireless router is in an idle state. In this case, the wireless router may be turned off to reduce power consumption.

Further, after it is detected that the wireless router has no connection with any terminal, wait a period of time (the third preconfigured duration); if the wireless router has no connection with any terminal within the period of time, turned off the wireless router. Specifically, when it is detected that all connections between the wireless router and terminals are released (that is, it is detected that the wireless router has no connection with any terminal), start a turn-off timer; if the wireless router establishes a connection with any terminal before the turn-off timer expires, turn off the timer and repeat step 201; if the turn-off timer expires, turn off the wireless router.

In this embodiment, the wireless router may detect whether the wireless router has a connection with a terminal; and the wireless router is turned off when the wireless router has no connection with any terminal within a preconfigured duration. In this way, the wireless router may be automatically turned off in the idle state, which saves energy resources and avoids unnecessary consumption.

Persons of ordinary skill in the art may understand that all or part of the steps of the method according to the embodiments may be implemented by a program instructing relevant hardware. The program may be stored in a computer readable storage medium. When the program runs, the steps of the method according to the embodiments are performed. The storage medium includes any medium capable of storing program codes, such as a ROM, a RAM, a magnetic disk, or a CD-ROM.

Figure 3:
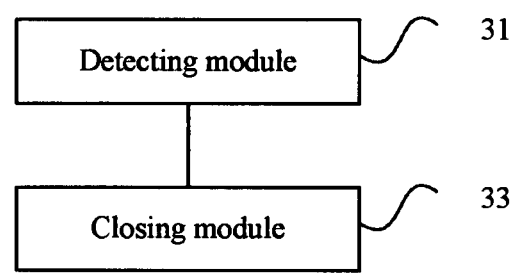
FIG. 3 is a schematic diagram of a first embodiment of a wireless router according to the present invention.

FIG. 3 is a schematic diagram of a first embodiment of a wireless router according to the present invention. As shown in FIG. 3, the wireless router includes a detecting module 31 and a closing module 33.

The detecting module 31 is configured to detect whether the wireless router has a connection with a terminal.

The closing module 33 is configured to turn off the wireless router if the detecting module 31 detects that the wireless router has no connection with any terminal.

The wireless router provided in this embodiment is configured to implement the method provided in the embodiment shown in FIG. 1. For a working procedure and principle of each module in this embodiment, refer to the description in the method embodiment shown in FIG. 1. No further description is provided here.

In this embodiment of the present invention, the detecting module of the wireless router may detect whether the wireless router has a connection with a terminal; and the closing module turns off the wireless router when the wireless router has no connection with any terminal. In this way, the wireless router may be automatically turned off in an idle state, which saves energy resources and avoids unnecessary consumption.

Figure 4:
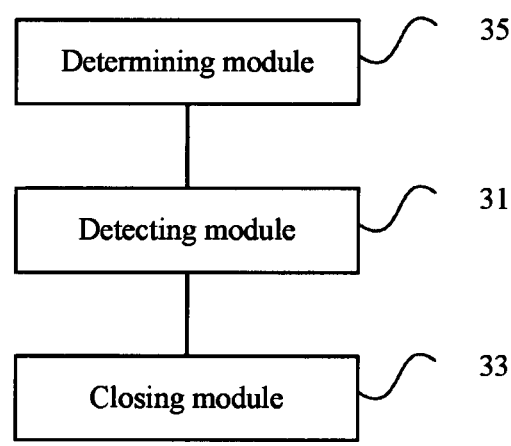
FIG. 4 is a schematic diagram of a second embodiment of a wireless router according to the present invention.

FIG. 4 is a schematic diagram of a second embodiment of a wireless router according to the present invention. On the basis of the embodiment shown in FIG. 3, FIG. 4 is as follows.

The detecting module 31 may be specifically configured to: if the wireless router does not transfer data within a first preconfigured duration, perform connection detection on an IP address of a terminal that has no data transmission within a second preconfigured duration; if a response is received, it is detected that the wireless router has a connection with the terminal; if no response is received, it is detected that the wireless router has no connection with the terminal.

Further, the wireless router may include a determining module 35.

The determining module 35 is configured to: obtain an IP address corresponding to the terminal from a data packet sent by a network side or the terminal; if no more data packet corresponding to the IP address is received within the second preconfigured duration, it is detected that the IP address is the IP address of the terminal that has no data transmission within the second preconfigured duration.

Alternatively, the detecting module 31 may be specifically configured to: detect whether a logical association between the wireless router and a terminal is established on an air interface; if a logical association exists, it is detected that the wireless router has a connection with the terminal; if no logical association exists, it is detected that the wireless router has no connection with the terminal.

The closing module 33 may be specifically configured to turnoff the wireless router if the wireless router has no connection with any terminal within a third preconfigured duration.

The wireless router provided in this embodiment is configured to implement the method provided in the embodiment shown in FIG. 1 or FIG. 2. For a working procedure and principle of each module in this embodiment, refer to the description in the method embodiment shown in FIG. 1 or FIG. 2.

In this embodiment, the detecting module of the wireless router may detect whether the wireless router has a connection with a terminal; and the closing module turns off the wireless router when the wireless router has no connection with any terminal within a preconfigured duration. In this way, the wireless router may be automatically turned off in an idle state, which saves energy resources and avoids unnecessary consumption.

Finally, it should be noted that the preceding embodiments are used only to describe the technical solutions of the present invention rather than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof without departing from the spirit and scope of the technical solutions of the embodiments of the present invention.

What is claimed is:

1. A method for controlling a wireless router, comprising:
   detecting, by the wireless router, whether the wireless router has a connection with a terminal;
   when the wireless router has no connection with any terminal, turning off the wireless router by the wireless router; and
   wherein detecting, by the wireless router, whether the wireless router has a connection with the terminal comprises:
     when the wireless router does not transfer data within a first preconfigured duration, performing connection detection on an IP address of the terminal that has no data transmission within a second preconfigured duration by the wireless router;
     when a response is received, determining that the wireless router has a connection with the terminal by the wireless router; and
     when no response is received, determining that the wireless router has no connection with the terminal by the wireless router.

2. The method according to claim 1, wherein detecting, by the wireless router, whether the wireless router has a connection with the terminal further comprises:
   obtaining the IP address of the terminal that has no data transmission within the second preconfigured duration by the wireless router;
   obtaining, by the wireless router, the IP address corresponding to the terminal from a data packet sent by a network side or the terminal; and
   when no more data packet corresponding to the IP address is received within the second preconfigured duration, determining that the IP address is the IP address of the terminal that has no data transmission within the second preconfigured duration by the wireless router.

3. The method according to claim 1, wherein performing connection detection on the IP address of the terminal that has no data transmission within the second preconfigured duration by the wireless router comprises:
   performing a Packet Internet Grope test on the IP address of the terminal that has no data transmission within the second preconfigured duration by the wireless router.

4. A wireless router, comprising:
   a detecting module, configured to detect whether the wireless router has a connection with a terminal;
   a closing module, configured to turn off the wireless router if the wireless router has no connection with any terminal; and
   wherein the detecting module is configured to:
     when the wireless router does not transfer data within a first preconfigured duration, perform connection detection on an IP address of a terminal that has no data transmission within a second preconfigured duration;
     when a response is received, it is detected that the wireless router has a connection with the terminal; and
     when no response is received, it is detected that the wireless router has no connection with the terminal.

5. The wireless router according to claim 4, further comprising:
   a determining module, configured to:
     obtain an IP address corresponding to the terminal from a data packet sent by a network side or the terminal; and
     when no more data packet corresponding to the IP address is received within the second preconfigured duration, it is detected that the IP address is the IP address of the terminal that has no data transmission within the second preconfigured duration.

* * * * *